United States Patent
Pullen et al.

[11] Patent Number: 5,962,942
[45] Date of Patent: Oct. 5, 1999

[54] ROTARY ELECTRICAL MACHINES

[75] Inventors: Keith Robert Pullen, Acton; Sameer Kulkarni, Evelyn Gardens, both of United Kingdom

[73] Assignee: The Turbo Genset Company Limited, Middlesex, United Kingdom

[21] Appl. No.: 08/978,824

[22] Filed: Nov. 26, 1997

Related U.S. Application Data

[63] Continuation of application No. PCT/GB96/01293, May 31, 1996.

[51] Int. Cl.⁶ .................................................. H02K 21/12
[52] U.S. Cl. .................................................. 310/156
[58] Field of Search ........................... 310/156, 62, 63; 290/54

[56] References Cited

U.S. PATENT DOCUMENTS

| | | | |
|---|---|---|---|
| 3,277,323 | 10/1966 | Parker | 310/61 |
| 3,867,655 | 2/1975 | Stengel et al. | 310/66 |
| 4,318,019 | 3/1982 | Teasley et al. | 310/156 |
| 4,451,749 | 5/1984 | Kanayama et al. | 310/62 |
| 4,594,525 | 6/1986 | Stokes | 310/156 |
| 4,678,922 | 7/1987 | Leininger | 290/54 |
| 4,757,222 | 7/1988 | Shiraki et al. | 310/68 B |
| 4,797,602 | 1/1989 | West | 310/156 |
| 4,850,100 | 7/1989 | Stokes | 29/596 |
| 4,954,736 | 9/1990 | Kawamoto et al. | 310/156 |
| 5,111,094 | 5/1992 | Patel et al. | 310/156 |
| 5,329,199 | 7/1994 | Yockey et al. | 310/263 |
| 5,525,842 | 6/1996 | Leininger | 290/54 |
| 5,616,974 | 4/1997 | Yamada | 310/68 B |
| 5,627,423 | 5/1997 | Marioni | 310/156 |
| 5,739,627 | 4/1998 | Lamb | 310/750 |
| 5,793,143 | 8/1998 | Harris et al. | 310/263 |

FOREIGN PATENT DOCUMENTS

| | | |
|---|---|---|
| 0133571 | 8/1984 | European Pat. Off. . |
| 0196086 | 3/1985 | European Pat. Off. . |
| 0196086 | 3/1986 | European Pat. Off. . |
| 0216024 | 6/1986 | European Pat. Off. . |
| 0634829 | 7/1994 | European Pat. Off. . |
| 0649211 | 10/1994 | European Pat. Off. . |
| 4214483 | 5/1992 | Germany . |

Primary Examiner—Thomas M. Dougherty
Assistant Examiner—Joseph Waks
Attorney, Agent, or Firm—Kaplan & Gilman, LLP; Jeffrey I. Kaplan

[57] ABSTRACT

A rotary electrical machine comprising a rotor having a plurality of equi-angularly spaced magnets is disclosed. The rotor further comprises fan blades, which are advantageously arranged in pairs between adjacent magnets. Air that enters the rotor through the center thereof is impelled radially outwards by the fan blades cooling the magnets. In a further embodiment, a rotary electrical machine in accordance with the present teachings includes at least one concentrically mounted diffuser disc having a plurality of circumferentially disposed equi-angularly spaced diffuser fins. The diffuser fins convert velocity energy into pressure, improving pumping efficiency.

17 Claims, 9 Drawing Sheets

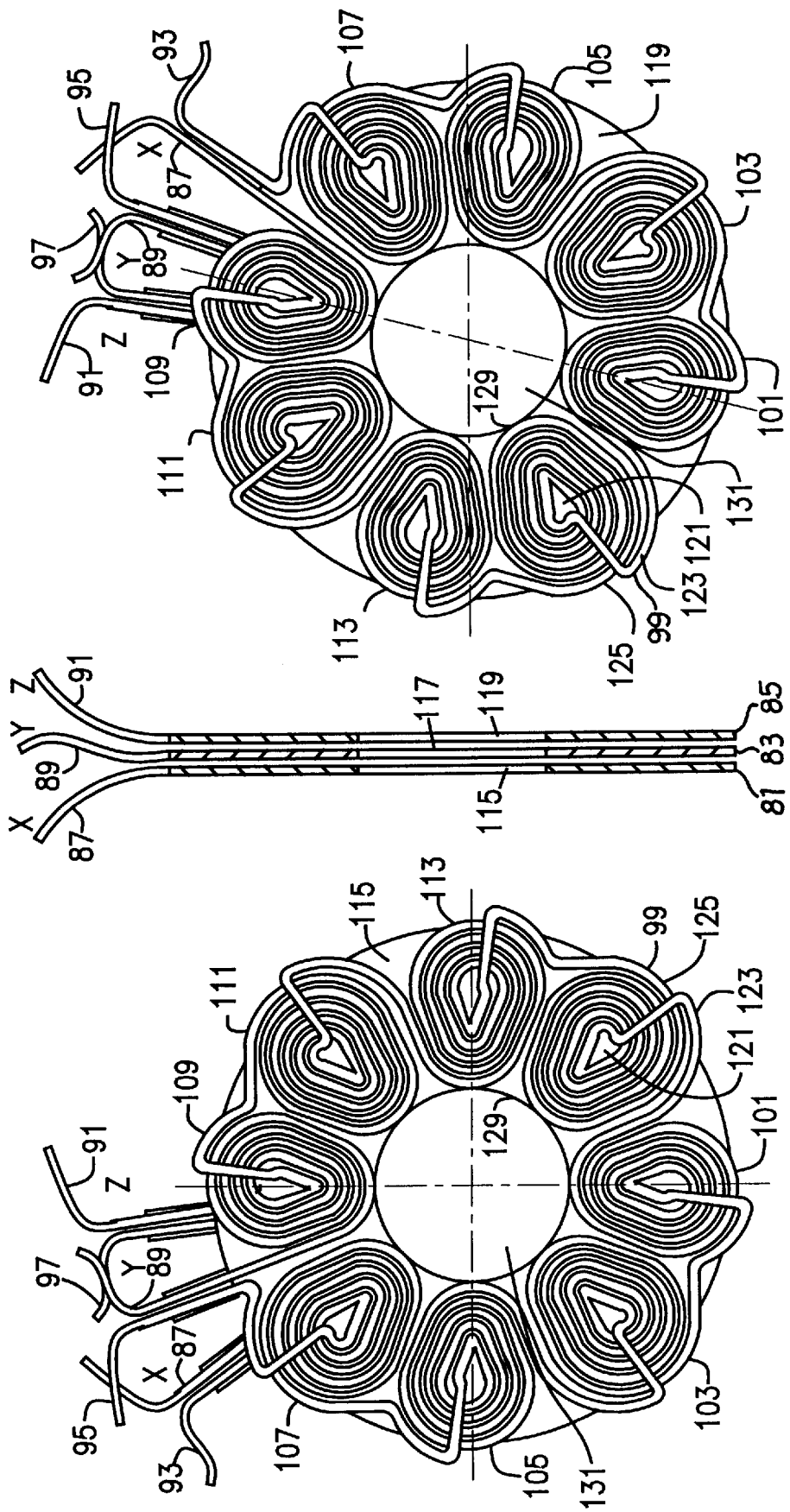

ROTARY ELECTRICAL MACHINES

This application is a continuation under 35 USC 120 and 35 USC 365 of PCT/GB96/01293.

The present invention relates to a rotary electrical machine of the kind in which a plurality of permanent magnets are arranged around a rotor and a stator is provided with appropriate electrical windings. Such machines can act as electrical motors, i.e. produce rotary motion upon application of electricity to the stator windings. Alternatively, they perform as electrical generators, i.e. alternators or dynamos, wherein rotary motion imparted to the rotor can produce an electrical output from the stator windings.

Machines of the aforementioned kind can be embodied in relatively compact efficient units. One application where small size, and high efficiency is called for is in automotive generators, for example automobile alternators. Many different alternator designs have been proposed since the inception of the internal combustion engine. One such proposal is disclosed in UK patent specification No. GB-A-2 174 252.

However, the constant demand for reduction in manufacturing costs, less consumption of raw materials, lightweight components, etc., means that there is a need for ever smaller, lightweight alternators. A significant improvement in meeting these aims is now realised, in accordance with a first aspect of the present invention, by provision of a rotor for an electrical machine, the rotor comprising a plurality of generally equi-angularly spaced magnets, the rotor further comprising at least one fan blade.

The design of the rotor according to the first aspect of the present invention offers a number of potential advantages:

a) the magnets are kept at the lowest temperature possible since the cooling air passes directly over them and the fan discs can act as heat sinks;

b) the design is compact and light; and c) low manufacturing cost since the fan discs can be pressed out in low cost steel, or similar material, or even moulded from a high temperature-resistant polymer material.

Of course, in practical realisations, such a rotor according to the present invention will usually be provided with a plurality of fan blades, preferably generally equi-angularly spaced around the rotor, for example between the magnets.

It will be appreciated that the aforementioned rotor component may be regarded as a conventional magnet-bearing rotor to which at least one fan blade has been added. Alternatively, it may be regarded as a conventional fan for an electrical machine, to which magnets have been added.

In a preferred embodiment described hereinbelow, a plurality of fan blades, e.g. two, are respectively arranged between adjacent magnets. These blades may extend generally radially, although preferably somewhat off-radius to form a channel which gives the highest pumping efficiency for the fan.

The rotor disc which bears the magnets may be formed integrally with the fan blade or blades but the fan element could be formed as a separate disc to be joined to the rotor disc, with the magnets, to form a unitary structure.

The fan blades may themselves be configured to retain, or help retain, the magnets within the rotor. This may be further facilitated by other means, for example, adhesive. Alternatively, separate mechanical means such as lugs may be provided for physical retention of the magnets.

Thus, a second aspect of the present invention provides a rotor for an electrical machine, the rotor comprising a plurality of generally equi-angularly spaced magnets secured to a surface of the rotor by mechanical means in the form of projections from the rotor surface. As indicated above, fan blades forming part of the rotor may themselves be specially configured to provide all or part of the projections which constitute the mechanical retention means.

In the context of the second aspect of the present invention, the concept of securing the magnets to a surface of the rotor includes both the possibility of securing the magnets mounted proud of the rotor surface and also the situation where the magnets are wholly or partially set within a respective recess in the surface.

In the case of the first and second aspects of the present invention, air enters the rotor through its centre and is impelled radially outwards by the fan blades so as to cool the magnets. The air then leaves the rotor at its circumference.

It is desirable to diffuse the cooling air after it has left the rotor. This converts velocity energy into pressure, leads to a greater pumping efficiency and hence more air flow for a given rotor speed. Thus, in accordance with a third aspect of the present invention, there is provided a rotary electrical machine comprising a rotor and a stator, the rotor comprising a plurality of magnets, the machine further comprising at least two diffuser fins for diffusing the cooling air leaving the rotor.

The electrical machine according to the third aspect of the present invention preferably comprises a plurality of equi-angularly spaced diffuser fins. The diffuser fins may be formed integrally with or mounted around the circumference of a diffuser disc, the diffuser disc being concentrically mounted with the rotor.

In a preferred embodiment of the third aspect of the present invention, the diffuser disc is preferably mounted on the stator. A second diffuser disc may be mounted on the other side of the stator, such that the stator is sandwiched between two diffuser discs. Alternatively, fins may be mounted to or formed integrally with the outer surfaces of the stator. The diffuser fins in either of the configurations described act as cooling fins for the stator as well as improving the fan pumping efficiency, and thus serve a dual purpose.

Naturally, the present invention extends also to a rotary electrical machine comprising a rotor according to the first and/or second aspect of the present invention. Furthermore, the electrical machine according to the third aspect of the present invention may comprise a rotor according to the first and/or second aspect of the present invention. A preferred embodiment of such a machine is an alternator but the present invention could be embodied in the form of any kind of rotary electrical machine, for example of any kind recited hereinbefore.

A rotary electrical machine according to the present invention may comprise just one rotor according to the invention and just one stator. However, it may comprise a plurality of stators and such rotors.

The design of the preferred embodiment of an alternator according to the invention, as described hereinbelow, has a number of advantages:

i) it has no slip rings which leads to reduced cost and increased reliability;

ii) the voltage is regulated by electronic means;

iii) the magnets may be button standard magnets which leads to low cost;

iv) since the rotor(s) is/are cooled by the fan arrangement described above, the higher temperature occurs in the stators coils which have less temperature limitations than the magnets;

v) a three phase spiral coil winding is normally used although the device may have one or any number of phases as required. A printed or etched stator could be used as an alternative to the wire wound design. A wave winding could also be used as an alternative to the spiral coil winding design as either wire wound, printed or etched; and vi) stationary iron is eliminated from the rotating magnetic circuit hence eliminating iron hysteresis and eddy current losses.

The present invention will now be explained in more detail by way of the following non-limiting description of preferred embodiments and with reference to the accompanying drawings, in which:

FIG. 7A shows a plan view from one side, FIG. 7B shows an axial cross-section and FIG. 7C shows a plan view from the other side of the coil windings of one of the stators of the alternators shown in FIGS. 3 and 6.

Figure 1:
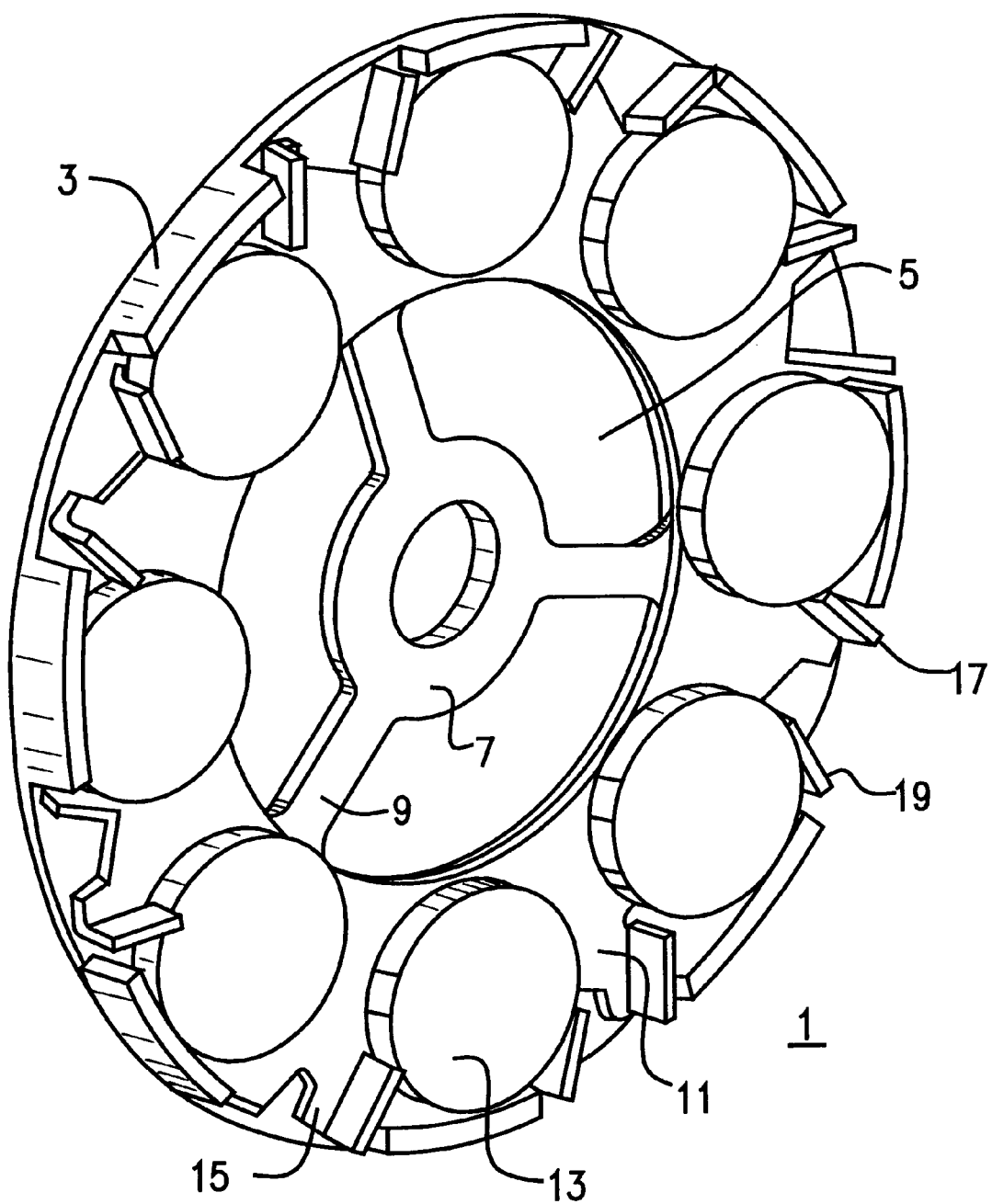
FIG. 1 shows a perspective view of a rotor disc according to the present invention.
Figure 2:
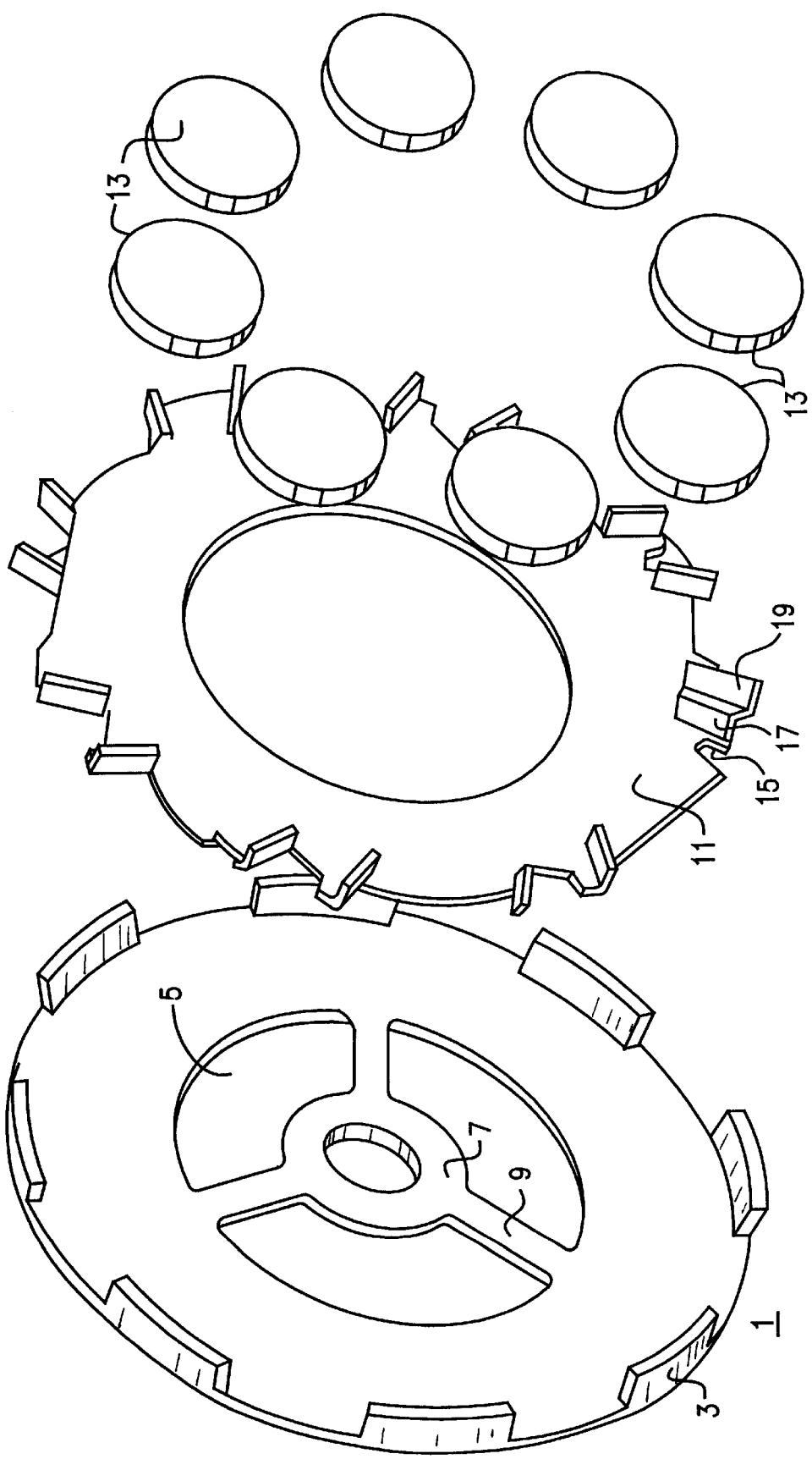
FIG. 2 shows an exploded view of a typical rotor disc depicted in FIG. 1.

FIGS. 1 and 2 show a rotor 1 in accordance with the present invention. It comprises a main rotor disc 3 of annular form, the central portion thereof 5 being cut-away to allow air flow except for a support ring 7 for receiving the alternator spindle (not shown). This support ring is mounted on a plurality of radial spokes 11.

A fan disc 11 of annular shape generally complimentary with the main rotor disc 3, is secured to the latter by press-fit formations. A plurality of equi-angularly spaced button magnets 13, etc. are secured to the fan disc 11, on the opposite side thereof to the main rotor disc, by means of adhesive.

The outer circumference 15 of the fan disc 11 is bent to define respective pairs of fan blades 17, 19, etc. which are mutually spaced apart but located between respective pairs of the button magnets 13 to define a radial duct means for drawing cooling air from the centre of the rotor, between the magnets.

Figure 3:
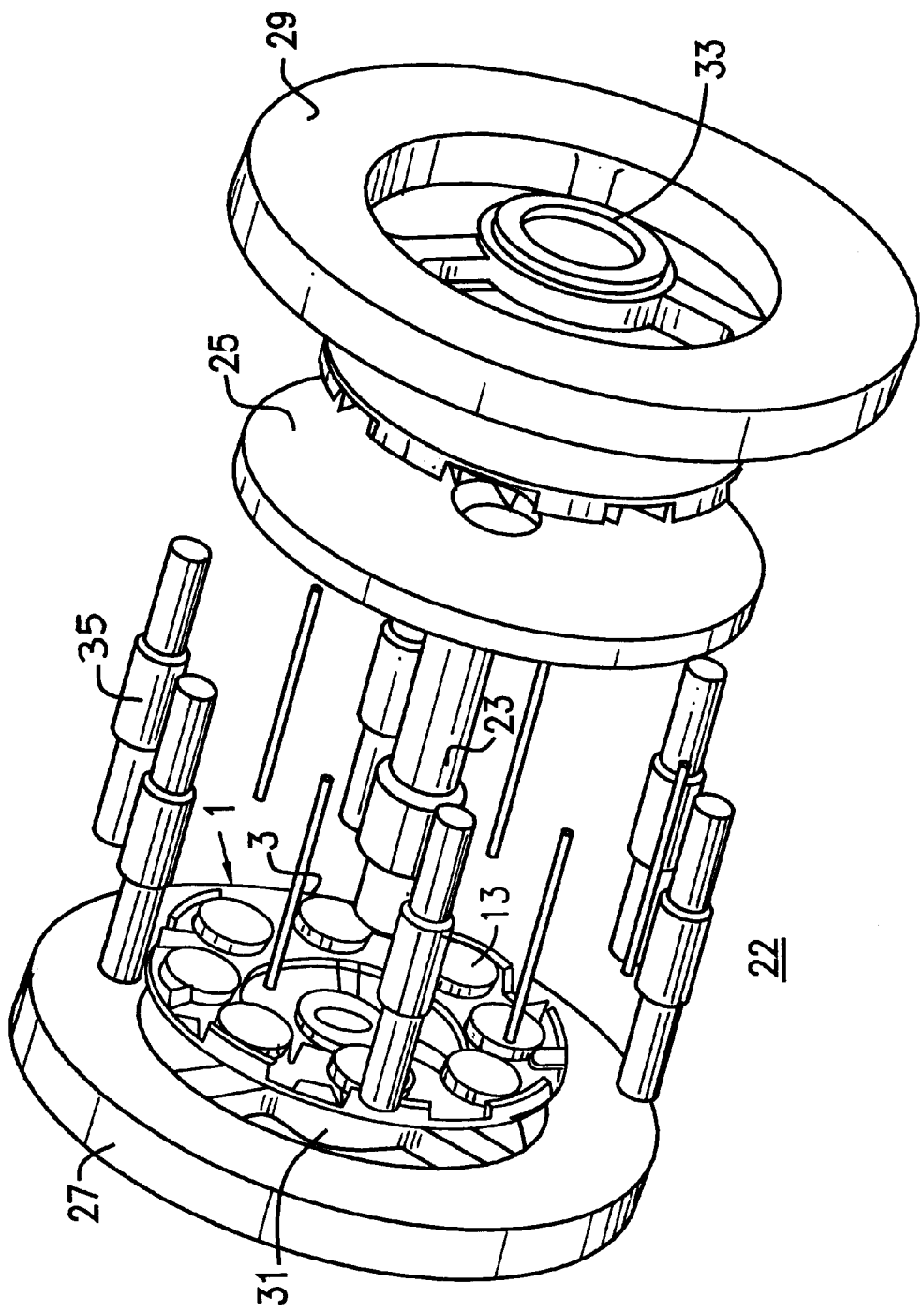
FIG. 3 shows an exploded view of an alternator according to the present invention, incorporating the rotor shown in FIGS. 1 and 2.

The rotor shown in FIGS. 1 and 2 is incorporated in an alternator 21, according to the present invention, as shown in FIG. 3. The rotor 1 is supported on a central spindle 23 concentric with a stator 25, between a first casing 27 and a second casing 29. The first and second casings 27, 29 are provided with central first and second bearings, 31, 33 respectively for the spindle 23. The assembly is held together by a plurality of circumferential bolts 35, etc.

Figure 4:
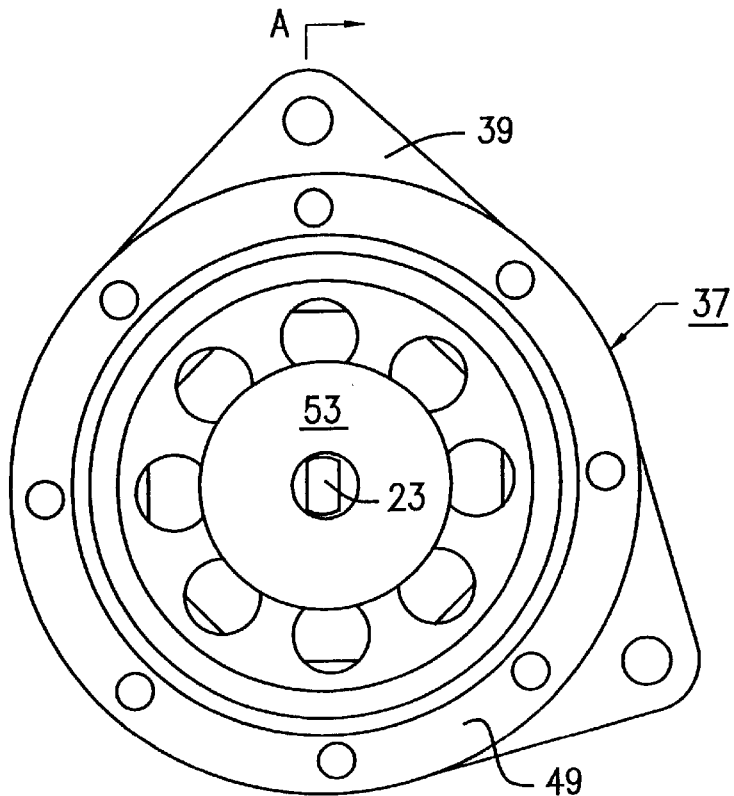
FIG. 4 shows a plan view of an alternative casing for the alternator shown in FIG. 3.
Figure 5:
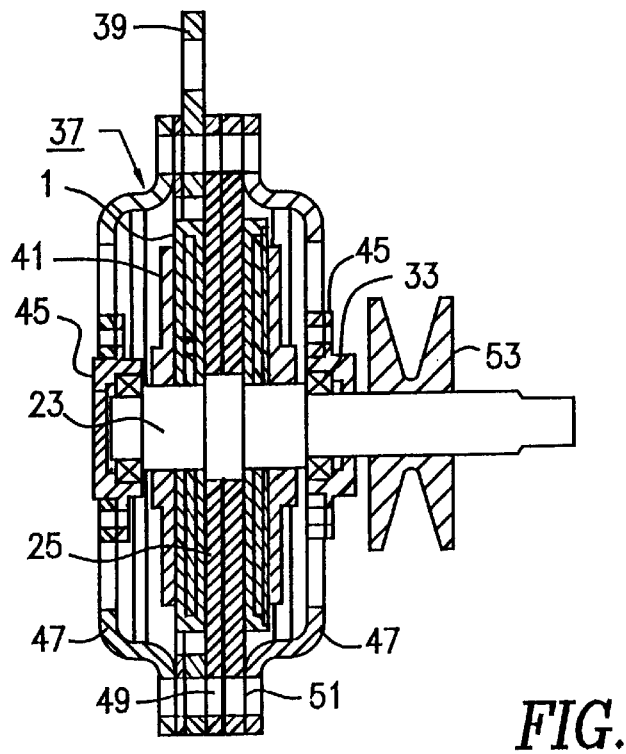
FIG. 5 shows an axial cross-section along the line A—A shown in FIG. 4.
Figure 13:
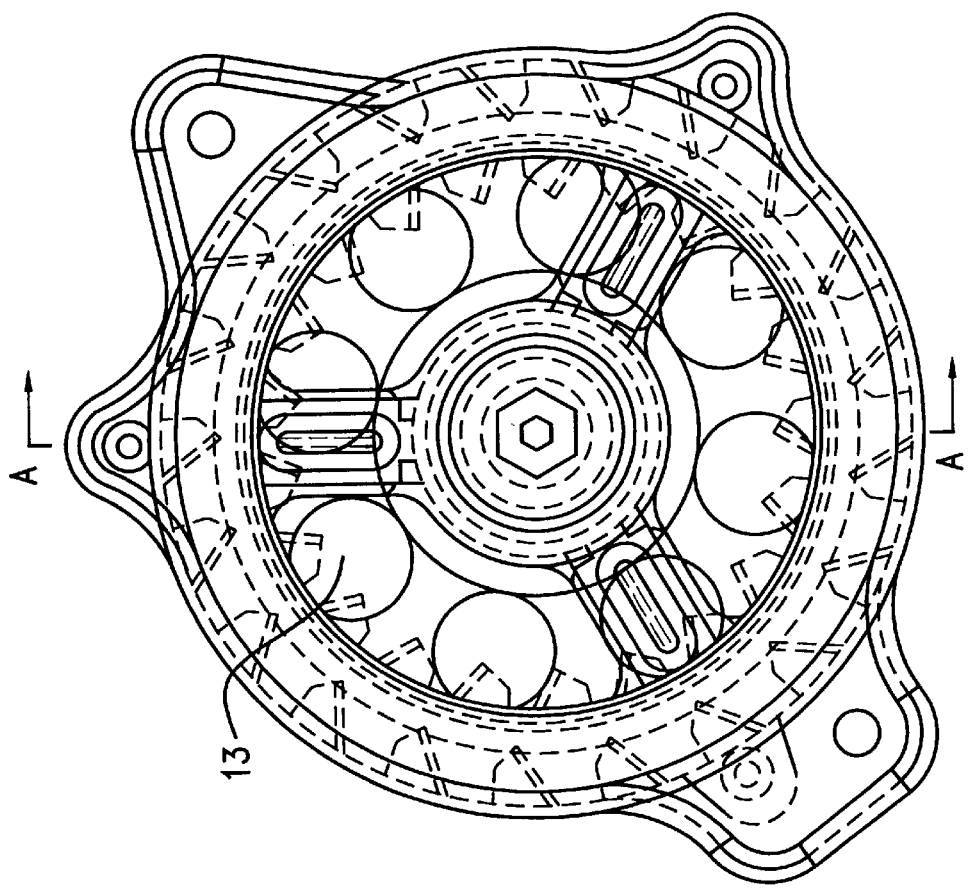
FIG. 13 shows a plan view of an alternator incorporating the stator and diffuser plates of FIG. 12.

The casing construction shown in FIG. 3 is intended for test purposes only. For a production design for use in an automobile, a more robust sealed casing would be necessary, for example a casing 37 as shown in FIGS. 4 and 13. This is provided with mountings 39, etc. for fixing to the engine block or chassis (not shown). The design incorporates respective keeper discs 41, etc. at either end of the rotor/stator assembly. The bearings 31, 33 are located in respective bearing housings 43, 45.

The casing 37 is formed of two pressed halves 47, 49 which are sealed together by means of packings 49, 51.

The spindle or shaft 23 as it emerges from the casing 37 is provided with a pulley 53 for a drive belt.

Figure 6:
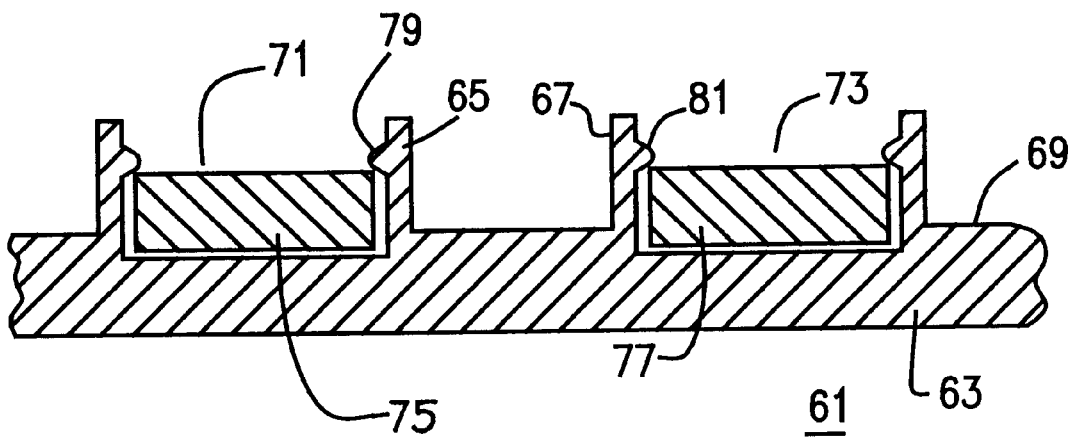
FIG. 6 shows a part cross-section through a periphery of an alternative rotor according to the present invention, having integral fan blades adapted for magnet retention.

FIG. 6 shows an alternative form of mounting of the magnets on the stators. In this design, a rotor 61 comprises a rotor disc 63 in which pairs of fan blades 65, 67, etc. are integrally formed upstanding from one surface 69 thereof. Thus, the fan blades are integral with the rotor disc rather than being provided on a separate member attached to the disc, as is the case with the embodiment of FIGS. 1–5.

A plurality of equi-angularly spaced button magnets 71, 73, etc. are located in respective recesses 25, 27, etc. between each pair of fan blades 65, 67, etc.

Since each fan blade 65, 67, etc. is formed with a respective lug 79, 81, etc., protruding over the respective recess 75, 77, etc., the button magnets are retained. The button magnets are located in each recess 75, 77 by push/snap-fit. Some adhesive may also be used for additional security.

The stator winding assembly for alternators as shown in FIGS. 3 or 6 will now be described with reference to FIGS. 7A–7C.

The windings are made in three planes 81, 83, 85 overlapping relative to the axis and each is provided with a respective connection 87, 89, 91 (with respective counter-connections 93, 95, 97) for a three-phase electrical output (denoted X, Y, Z).

The windings are each formed into eight respective coil sectors 99, 101, 103, 105, 107, 109, 111, 113. It will be appreciated that each set of windings in the respective planes 81, 83, 85 are formed on or within respective laminar supports 115, 117, 119.

Each coil sector 99, etc., is the same shape. For convenience, this will be described here only with reference to one such sector 99. The sector is generally spiral in shape with the wiring spiralling from the middle 121 to the periphery 123 thereof. The radially outermost part 125 adjacent the stator periphery 127 is generally rounded. The innermost part 129 adjacent the opening 131 is inwardly pinched.

Figure 8:
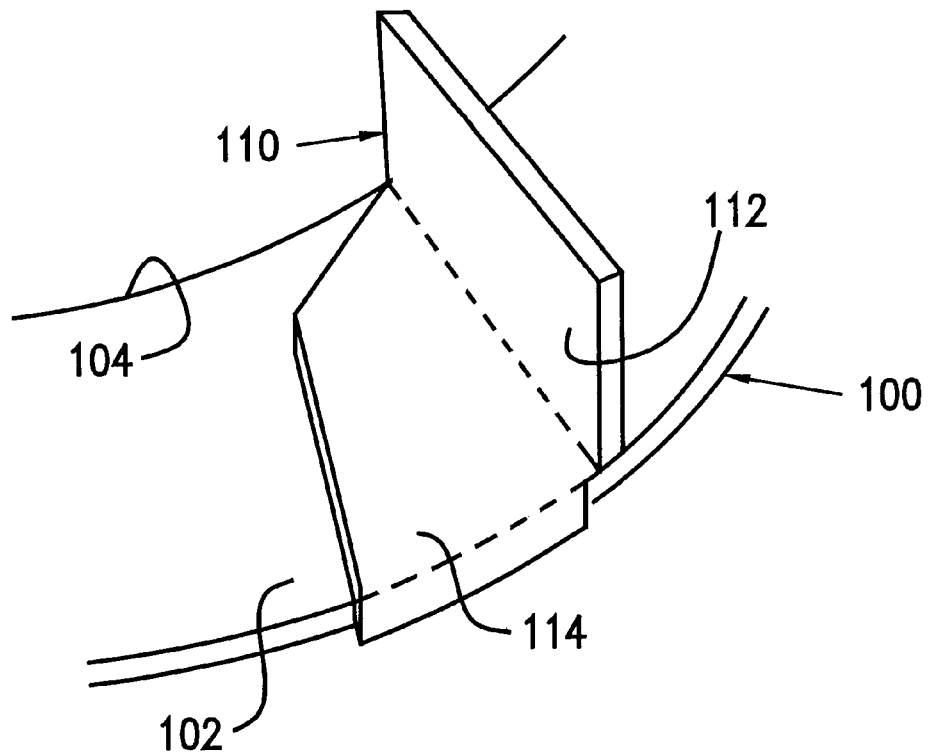
FIG. 8 shows a perspective view of a diffuser fin for an electrical machine according to the third aspect of the present invention.
Figure 10:
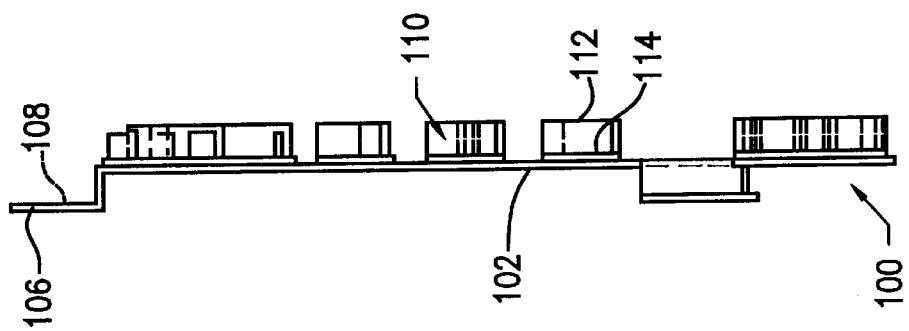
FIG. 10 shows a side view of the diffuser plate of FIG. 9.
Figure 9:
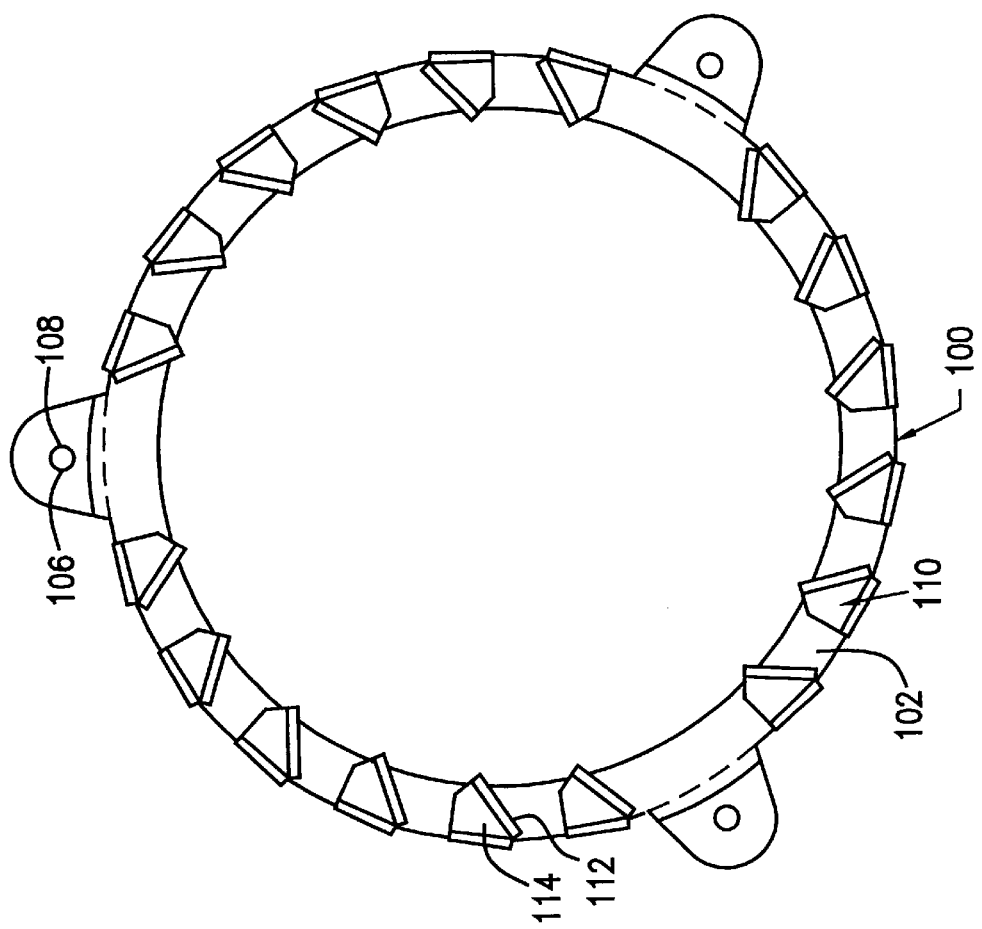
FIG. 9 shows a plan view of a diffuser plate for an electrical machine according to the third aspect of the present invention.

Referring to FIGS. 8 to 10 of the drawings, the alternator according to a preferred embodiment of the present invention comprises at least one diffuser plate 100. Each diffuser plate 100 comprises a diffuser disc 102 of annular form, the central portion thereof being cutaway to define an annular opening 104. Three equi-angularly spaced mounting lugs 106 extend from the outer circumference of the diffuser disc 102, each lug 106 being formed with an aperture 108 for receiving a bolt (not shown).

One surface of the diffuser disc 102 is provided with a plurality of equi-angularly spaced circumferential diffuser fins 110. Each diffuser fin 110 comprises a generally rectangular guide blade 112 and a support member 114 which is formed integrally with and perpendicular to the guide blade 112. The diffuser fins 110 are mounted on the diffuser disc 102 such that the guide blades 112 are normally perpendicular to the plane of the disc 102, as shown in FIG. 8. The diffuser fins 110 may be mounted such that the guide blades 112 extend radially. However, the guide blades 112 preferably extend somewhat off radius so as to form a channel at the correct angle receiving the air from the rotor.

Figure 12:
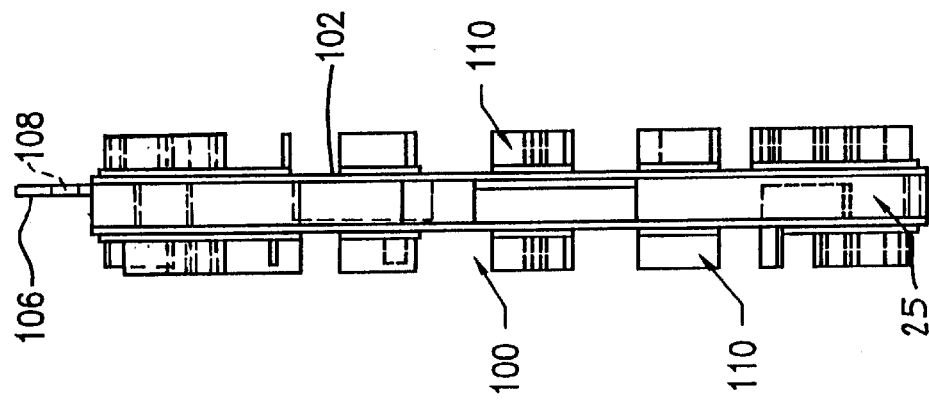
FIG. 12 shows a side view of the stator and diffuser plates of FIG. 11.
Figure 11:
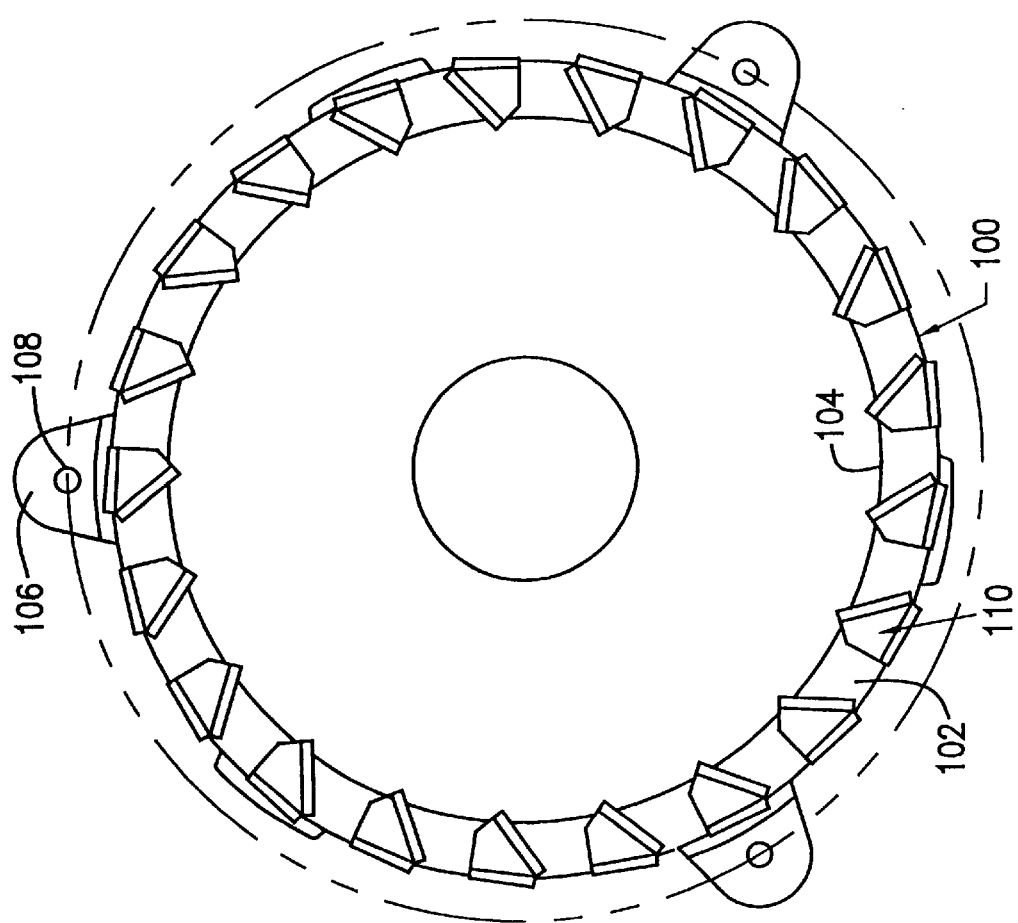
FIG. 11 shows a plan view of a stator for an electrical machine according to the third aspect of the present invention, the stator being mounted between two diffuser plates.

Referring to FIGS. 11 and 12, a stator 25 is mounted concentrically between two diffuser plates such that the diffuser fins 110 face outwardly of the stator 25. The mounting lugs 106 protrude outwardly of the rear surface of the diffuser plates 100 so as to form a recess for receiving and retaining the stator 25. The diffuser plates are mounted so as to remain stationary when the machine is in use.

Figure 14:
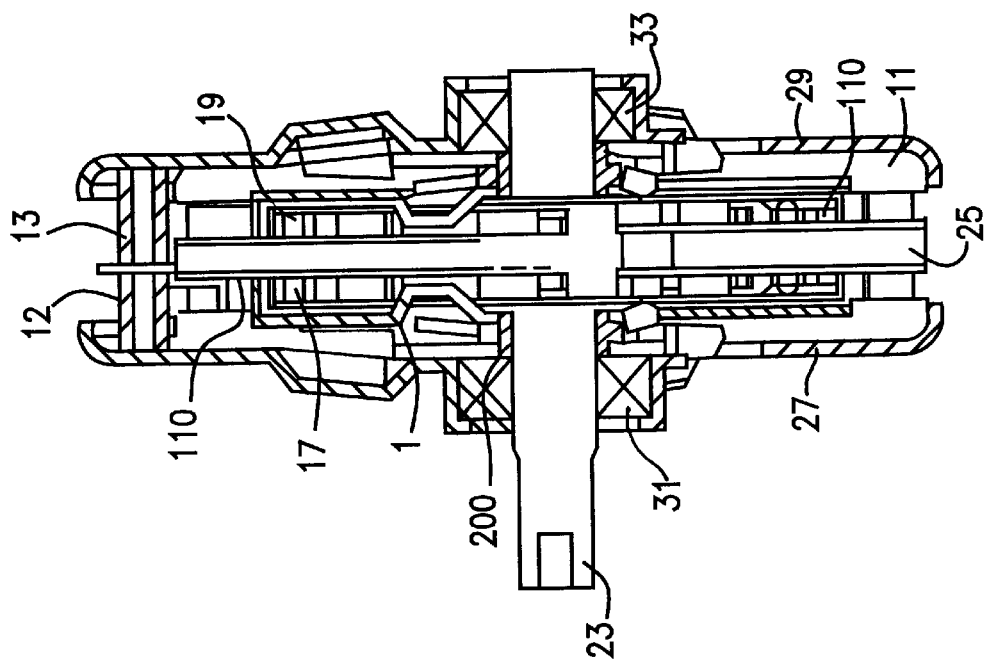
FIG. 14 shows an axial cross-section through the line A—A shown in FIG. 13.

Referring now to FIGS. 13 and 14, the rotor 1 is supported on a central spindle 23 concentric with a stator 25, between a first casing 27 and a second casing 29. As can be seen in particular from FIG. 13, the diffuser fins 112 are arranged so as to be off-radius in one direction, while fan blades 17, 19 on the rotor are off-radius in the other direction.

Thus, in use, when the rotor rotates, air is drawn into the rotor through the centre. The air is then radially impelled outwards away from the centre of the rotor by the fan blades 17, 19, thereby cooling the magnets. This ensures that substantially all of the components of the rotor are cooled as the air is impelled away from the centre of the rotor, even in very high speed machines. Finally, the air leaves the rotor and is impelled towards the diffuser fins, where it is diffused after it has left the rotor. This converts velocity energy into pressure, leads to greater pumping efficiency and hence more air flow for a given rotor speed. Furthermore, since the rotor is supported on radial spokes or ribs, in a so-called "spider" arrangement, a relatively large volume of air is permitted to enter the rotor for effective cooling thereof.

Thus, the rotor, and in particular, the magnets are held at the lowest possible temperature, and the higher temperature occurs in the stator coils which have less temperature limitations than the magnets.

In the light of this disclosure, modifications of the described embodiments, as well as other embodiments, all within the scope of the present invention as defined by the appended claims, will now become apparent to persons skilled in the art.

We claim:

1. An article comprising a rotor for an electrical machine, the rotor comprising a plurality of generally equi-angularly spaced magnets, the rotor further comprising a pair of fan blades located between a pair of said magnets, thereby forming means for impulsion of air away from the center of said rotor.

2. The article (A rotor) according to claim 1, wherein the pair of fan blades and the plurality of magnets are disposed on a first face of the rotor.

3. The article (A rotor) according to claim 2, wherein the fan blades are physically adapted to help secure the magnets to the first face of the rotor.

4. The article (A rotor) according to claim 3, wherein the physical adaptation are lugs that extend over the magnets.

5. The article (A rotor) according to claim 3, wherein each of the magnets are seated in a respective recess.

6. The article (A rotor) according to claim 1, further comprising a rotor disc, a central portion of which rotor disc is cut-away except for a support ring for receiving a central drive shaft, the support ring being mounted on radial spokes.

7. The article (A rotary electrical machine comprising a rotor) according to claim 1, further comprising a rotary electrical machine that includes the rotor.

8. The article (A machine) according to claim 7, the rotary electrical machine comprising an alternator.

9. A rotary electrical machine comprising a rotor and a stator, the rotor comprising a plurality of magnets, the machine further comprising at least two diffuser fins for diffusing cooling air leaving the rotor, wherein each diffuser fin is mounted around or formed integrally with the circumference of a diffuser disc, the central portion of said disc being cut away.

10. The rotary electrical machine according to claim 9, wherein the converter means comprises a plurality of equi-angularly spaced diffuser fins.

11. The rotary electrical machine according to claim 10, wherein each diffuser fin is disposed about a circumference of a first diffuser disc, a central portion of said first diffuser disc being cut away.

12. The rotary electrical machine according to claim 11, wherein the first diffuser disc having the diffuser fins is mounted concentrically with the rotor.

13. The rotary electrical machine according to claim 12, wherein the first diffuser disc having the diffuser fins is mounted on the stator.

14. The rotary electrical machine according to claim 13, further comprising a second diffusor disc, wherein said first and second diffusor discs are mounted on either side of the stator such that the stator is sandwiched therebetween, the second diffuser disc having diffuser fins.

15. The rotary electrical machine according to claim 9, wherein the rotary electrical machine comprises an alternator.

16. The rotary electrical machine according to claim 9, wherein said magnets are equi-angularly spaced, the rotor further comprising at least one fan blade located between a pair of magnets.

17. The rotary electrical machine according to claim 16, wherein a pair of fan blades are located between a pair of magnets.

* * * * *